(12) United States Patent
Cline et al.

(10) Patent No.: US 10,370,084 B2
(45) Date of Patent: Aug. 6, 2019

(54) METHODS AND APPARATUS TO ADJUST FOLDING WING TIPS

(71) Applicant: The Boeing Company, Chicago, IL (US)

(72) Inventors: Paul Jay Cline, Lake Stevens, WA (US); Arnold F. Agdamag, Mountlake Terrace, WA (US)

(73) Assignee: The Boeing Company, Chicago, IL (US)

( * ) Notice: Subject to any disclaimer, the term of this patent is extended or adjusted under 35 U.S.C. 154(b) by 75 days.

(21) Appl. No.: 15/656,840

(22) Filed: Jul. 21, 2017

(65) Prior Publication Data

US 2019/0023373 A1 Jan. 24, 2019

(51) Int. Cl.
*B64C 3/56* (2006.01)

(52) U.S. Cl.
CPC ..................... *B64C 3/56* (2013.01)

(58) Field of Classification Search
CPC ....................................................... B64C 3/56
See application file for complete search history.

(56) References Cited

U.S. PATENT DOCUMENTS

| | | | | |
|---|---|---|---|---|
| 3,647,163 A * | 3/1972 | Swwwney | ................ | B64C 3/56 244/49 |
| 5,201,479 A * | 4/1993 | Renzelmann | ............. | B64C 3/56 244/49 |
| 5,381,986 A * | 1/1995 | Smith | ....................... | B64C 3/56 244/49 |
| 5,427,329 A * | 6/1995 | Renzelmann | ............. | B64C 3/56 244/49 |
| 7,130,725 B2 * | 10/2006 | Burner | .................... | G01C 11/00 701/3 |
| 9,452,820 B1 * | 9/2016 | Wirth | ........................ | B64C 3/56 |
| 9,469,392 B2 * | 10/2016 | Fox | ........................ | B64C 23/072 |
| 2004/0000619 A1 * | 1/2004 | Barriety | .................... | B64C 3/52 244/219 |
| 2004/0079835 A1 * | 4/2004 | Volk | .......................... | B64C 9/22 244/76 C |
| 2005/0133672 A1 * | 6/2005 | Irving | ................... | B64C 23/072 244/201 |
| 2006/0136102 A1 * | 6/2006 | Burner | ................... | G01C 11/00 701/3 |
| 2007/0152098 A1 * | 7/2007 | Sheahan, Jr. | ............. | B64C 3/56 244/49 |
| 2007/0262207 A1 * | 11/2007 | Morgenstern | ............. | B64C 3/16 244/214 |
| 2008/0277526 A1 * | 11/2008 | Willdig | ..................... | B64C 1/12 244/117 A |
| 2011/0266809 A1 * | 11/2011 | Calverley | ................. | F03D 5/00 290/55 |

(Continued)

*Primary Examiner* — Tyler J Lee
(74) *Attorney, Agent, or Firm* — Hanley, Flight and Zimmerman, LLC

(57) ABSTRACT

Methods and apparatus to adjust folding wing tips are disclosed. A disclosed example apparatus includes an actuator to cause a movement of a folding portion of an aerodynamic structure, where the folding portion has an associated backlash. The example apparatus also includes a sensor to acquire movement data of the folding portion during movement of the folding portion, and a processor to determine a bias of the folding portion based on the movement data to characterize the backlash.

19 Claims, 11 Drawing Sheets

(56) References Cited

U.S. PATENT DOCUMENTS

| | | | |
|---|---|---|---|
| 2012/0280080 A1* | 11/2012 | Lubenow | B64C 39/024 244/49 |
| 2014/0061371 A1* | 3/2014 | Good | B64C 3/56 244/49 |
| 2015/0360765 A1* | 12/2015 | Bradshaw | B64C 23/076 244/45 R |
| 2016/0207608 A1* | 7/2016 | Good | B64C 3/56 |
| 2017/0029089 A1* | 2/2017 | Alexander | B64C 3/40 |
| 2017/0043864 A1* | 2/2017 | Axford | B64C 3/185 |
| 2017/0113780 A1* | 4/2017 | Boye | B64C 3/56 |

* cited by examiner

METHODS AND APPARATUS TO ADJUST FOLDING WING TIPS

FIELD OF THE DISCLOSURE

This disclosure relates generally to folding aircraft wing tips and, more particularly, to methods and apparatus to adjust folding wing tips.

BACKGROUND

In recent years, some commercial aircraft have been designed with relatively large wingspans to increase fuel efficiency and/or increase carrying capacity. However some airports are not able to accommodate these larger wingspans. Accordingly, some of these aircraft have implemented folding wing tips to reduce an effective wing span to enable movement through these airports while still retaining fuel-efficiency advantages associated with the relatively large wing spans.

A typical folding wing tip system has an actuation system to fold and extend a wing tip. Because the degree to which the folding wing tip is rotated relative to a neutral angle (e.g., a rotated angle of 0 degrees relative to a wing centerline reference) can significantly impact the latching, locking, and aerodynamic performance during flight, coordinating and/or controlling the actuation system to rotate the wing tip accurately can be important. However, backlash and/or biases of the wing tip or an associated actuation system (e.g., a drive system) can result in inaccurate position control or centering of the wing tip, thereby resulting in reduced latching, locking mechanism malfunction and/or an increased drag coefficient.

Some known wing tip centering or position calibration techniques involve manual adjustment and/or alignment based on operator judgment (e.g., manual visual adjustment). Some other known techniques involve a fixture, such an index plate to align the wing tip. However, these known centering and/or positioning techniques may result in inaccuracies, may be time consuming and/or cannot adjust to backlash internal to the actuation or drive system

SUMMARY

An example apparatus includes an actuator to cause a movement of a folding portion of an aerodynamic structure, where the folding portion has an associated backlash. The example apparatus also includes a sensor to acquire movement data of the folding portion during movement of the folding portion, and a processor to determine a bias of the folding portion based on the movement data to characterize the backlash.

An example method includes moving, via an actuator, a folding portion of an aerodynamic structure, the folding portion having an associated backlash, and acquiring movement data during the moving of the folding portion. The example method also includes calculating, via a processor, a bias of the folding portion based on the movement data to characterize the backlash.

An example tangible machine readable medium comprising instructions, which when executed, cause a processor to at least determine a bias of a folding portion of an aerodynamic structure based on movement data of the folding portion to characterize a backlash associated with the folding portion.

Figure 1:
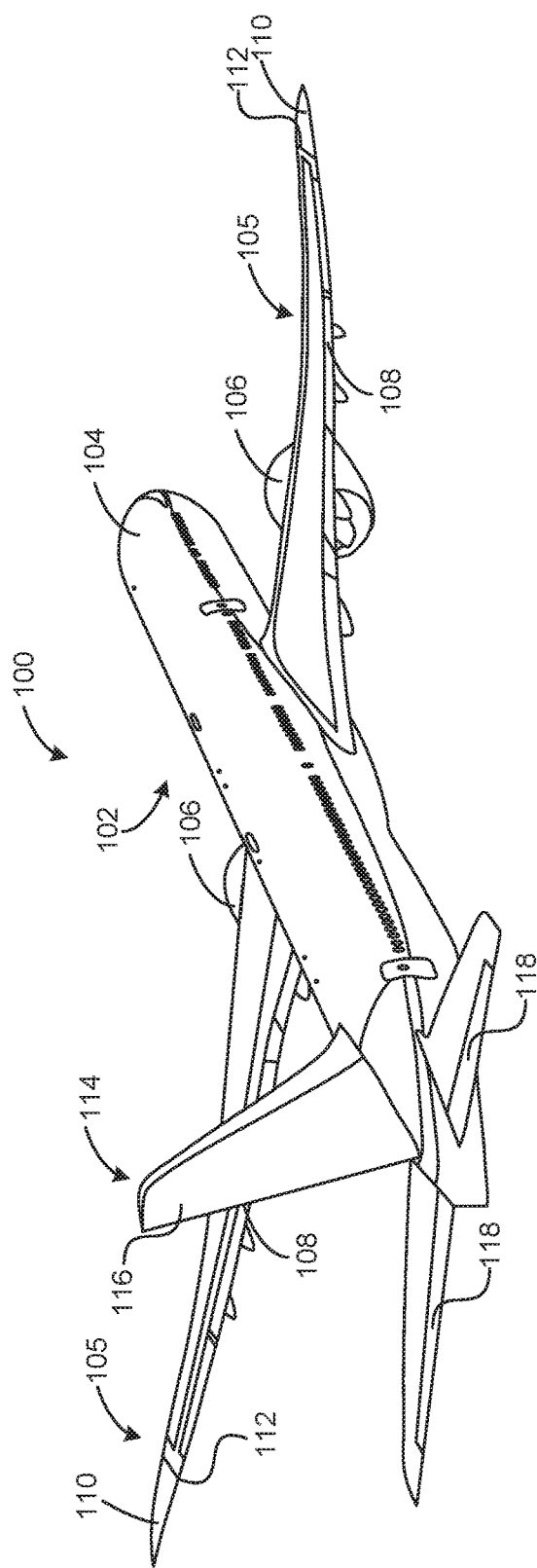
FIG. 1 is an example aircraft in which the examples disclosed herein may be implemented.

The figures are not to scale. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to adjust folding wing tips are disclosed. Some known folding wing tip systems employ actuators to rotate a wing tip about a hinge. However, these known folding wing tip systems often have associated biases related to measurement of the actuation system and/or a mechanical hinge assembly (e.g., biases due to tolerances, part fits, installation orientation, etc.) that folds or rotates the wing tip about the hinge. Such biases may result in non-zero centering and/or inaccurate position control of the wing tip (e.g., when the wing tip is positioned or angled to form part of an aerodynamic surface). Some known centering or rigging techniques involve alignment fixtures and/or operator adjustment, both of which can be time-consuming and can result in inaccurate movement control and cannot deal with backlash internal to the actuation or drive system.

The examples disclosed herein provide automated, accurate control to rig sensors to compensate for biases that may be inherent in a drive/actuation system and/or a hinge folding portion (e.g., a rotatable portion) of an actuated folding system. In particular, the examples disclosed herein characterize a backlash of the folding portion by causing a movement of the folding portion based on a known signal input waveform, acquiring movement data during the movement, and determining a bias of the folding portion based on the movement data. In turn, this bias is used to define a calibration position (e.g., an adjusted rotation position that takes into account (e.g., compensates for) a bias, which may result from an associated backlash) and/or a corrected motion (e.g., a correction motion profile) of the folding portion so that rotation of the folding portion is controlled accurately.

In some examples, the movement or rotation of the folding portion is based on a signal input waveform that is implemented as a triangular or sawtooth waveform. In some examples, histogram data, which may pertain to position and/or pressure data, is utilized to determine a degree of bias and/or backlash that may be present in a folding system. In some examples, hydraulic pressure data (e.g., a change in pressure differences or pressure differentials measured by a pressure sensor) is utilized to determine a drive line bias corresponding to a hydraulic actuation system that moves the folding portion.

As used herein, the term "backlash" refers to a physical and/or mechanical characteristic of a component and/or assembly that results in lost motion such that at least one of an assembly moves relative to another part of the assembly to which it is operatively coupled before the other part begins to move with the at least one part. Accordingly, backlash can be related to a bias associated with controlling movement of an assembly of components that are to move together. Further, the term "backlash," as described in the context of a rotating part, can refer to a characteristic of a hinge joint or actuation of the hinge joint that alters a rotational behavior of the moving part/portion such that one part of an assembly may rotate some amount before imparting movement in another part to which it is operatively coupled. For example, a relative looseness or tolerances between parts of a rotating assembly can produce backlash.

As used herein, the term "bias" refers to a physical, actuation and/or measurement offset that alters or changes a reference position or measurement of the position or orientation of the moving part/portion (e.g., an offset from a true zeroed rotational calibration angle). In particular, the term "bias" can refer to a bias caused by backlash, a component misalignment and/or a measurement error that can shift a component from a position that is assumed during typical motion, for example. Accordingly, the term "hinge line bias" can refer to a bias or offset associated with a rotating or folding the moving part/portion about a hinge and/or a hinge joint defined between the moving part/portion and a relatively stationary component. Further, the term "drive line bias" can refer to an offset in rotational angle (from an expected or ideal rotational angle) due to backlash, rotational offsets and/or a measurement error in an actuation system and/or control of components coupled to the actuation system.

As used herein, the terms "triangular waveform" and "sawtooth waveform" refer to waveforms having a generally repeating pattern of rising linear portions followed by respective falling linear portions. Accordingly, as used herein, the terms "triangular waveform" and "sawtooth waveform" can refer to input command angles (e.g., defined angles over periodic time signals) or applied signals (e.g., voltage input signals in a triangular waveform).

FIG. 1 illustrates an example aircraft 100 in which the examples disclosed herein may be implemented. The aircraft 100 of the illustrated example includes a fuselage 102 with a cockpit portion 104, wings 105 with engines 106 and control surfaces (e.g., flaps, ailerons, tabs, etc.) 108, which are located at a trailing edge of the wings 105 and may be displaced or adjusted (e.g., angled, etc.) to provide lift during takeoff, for example. According to the illustrated example, the wings 105 include folding wing tips 110 that are foldable about respective hinge lines (e.g., axes of rotation) 112.

The example aircraft 100 also includes stabilizers 114 with a rudder 116 and elevators 118. In this example, the resultant thrust of the engines 106 along with movement of the control surfaces 108, the rudder 116 and/or the elevators 118 are used to control/direct the aircraft 100 during flight.

In operation, the wing tips 110 are actuated to fold out to increase an effective width of the aircraft 100 in a deployed state (shown) to enable an increased effective wing span during flight (e.g., cruise), thereby reducing a drag coefficient of the aircraft 100 and, in turn, fuel consumption. In contrast to the configuration of the wing tips 110 shown in FIG. 1, the wing tips 110 can be folded inward in a direction generally towards the fuselage 102 to reduce the effective wingspan when the aircraft 100 is maneuvering on the ground, for example. Folding of the wing tips 110 is shown and described in more detail below in connection with FIGS. 2A and 2B.

Figure 2:
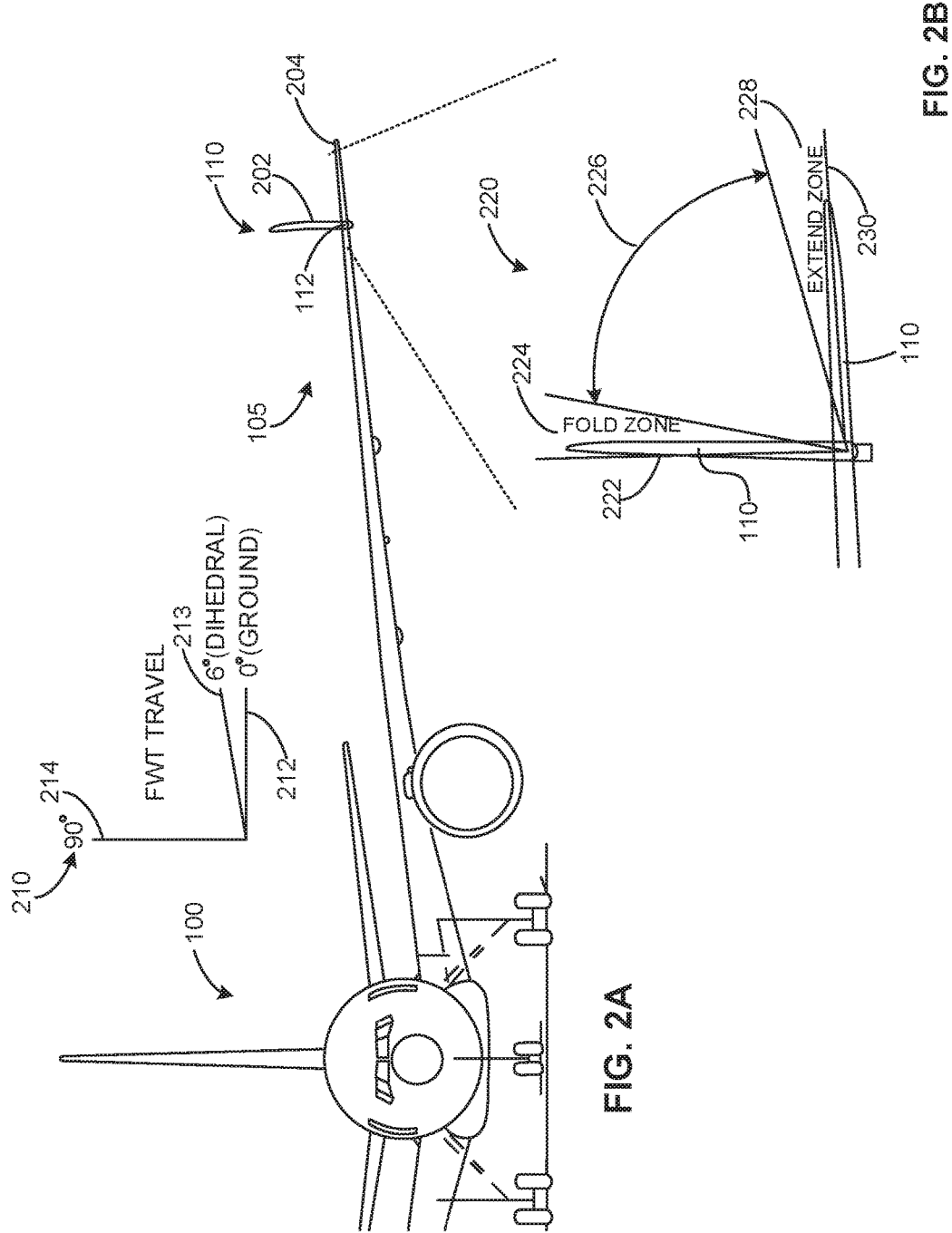
FIG. 2A illustrates folding angles or ranges of example folding wing tips of the example aircraft of FIG. 1.
FIG. 2B is a detailed view illustrating angular folding range zones of the example folding wing tips.

FIG. 2A illustrates folding angles or ranges of the example folding wing tips 110 of the example aircraft 100 of FIG. 1. As can be seen from the illustrated example of FIG. 2A, each of the wing tips 110 of the wings 105 folds and rotates about their respective hinge lines 112 between a folded or stowed position 202 and a deployed position 204.

According to the illustrated view of FIG. 2A, an angular range 210 of the wing tip 110 relative to ground is shown. In particular, a first angle 212 represents a zero ground, a second angle 213 represents the deployed position 204 relative to ground, and a third angle 214 represents the folded position 202 relative to ground.

FIG. 2B is a detailed view illustrating angular folding range zones 220 of the example folding wing tip 110 of FIGS. 1 and 2A. In contrast to the angular range 210 of FIG. 2A, the zones 220 are defined relative to the deployed position 204, which corresponds to the zero degree angle position in this angular reference frame, and not ground. In other words, the folding range zones 220 are defined relative to the fully deployed position 204 of the wing tip 110 in which the wing tip 110 is mechanically locked. Accordingly, the angular folding range zone 220 includes a fully folded position 222, a fold zone 224, a transition zone 226, an extend zone 228 and a fully deployed position (e.g., a fully extended position, an extend stop, etc.) 230 that corresponds to the deployed position 204. The examples disclosed herein may be applied to any of the zones 224, 226, 228 (e.g., defined input signal waveforms control a rotation of the wing tip 110 in the zones 224, 226, 228 to characterize a bias and/or a backlash).

Figure 4:
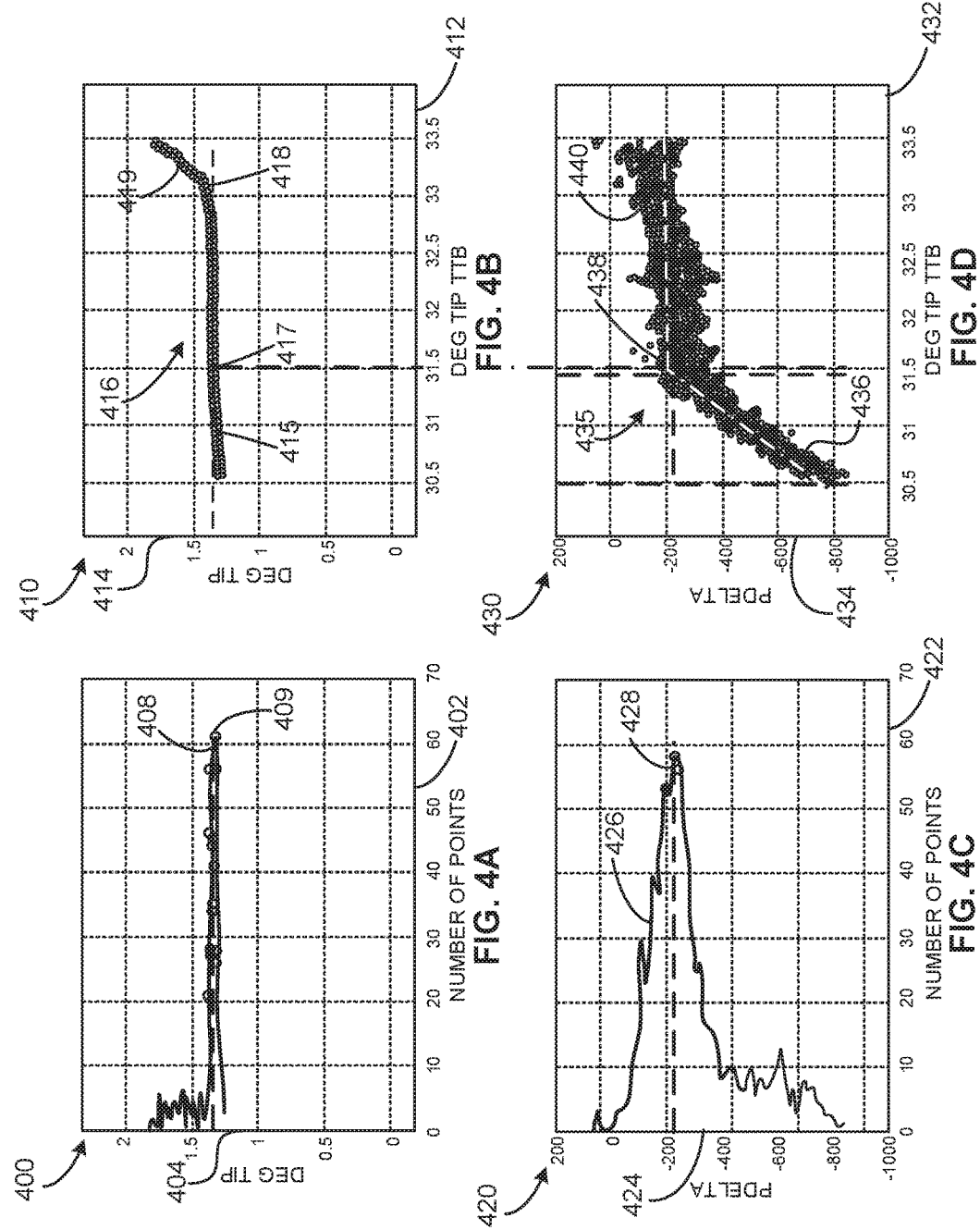
FIGS. 4A-4D are example graphs illustrating bias calculations to characterize backlash in accordance with the teachings of this disclosure.

As will be discussed in further detail below in connection with FIGS. 4A-4B, different types of biases can result in inaccurate control of movement of the wing tip 110. In particular, a hinge line bias of the folding wing tip 110 may occur due to part or assembly tolerances, backlash, and/or part interactions (e.g., moving part surface interface(s). Further, in addition to the aforementioned hinge line bias, a drive line bias of the folding wing tip 110 may result from mechanical tolerances of a respective actuation system (e.g., a hydraulic actuation system), assembly or installation of the hydraulic system and measurement components, and/or tolerances resulting from actuator movement.

The examples disclosed herein calculate hinge line and drive line biases so that position sensors can be rigged to properly position and/or center the wing tip 110 (e.g., center the wing tip 110 at a center position corresponding to the fully deployed position 230, which corresponds to a 0 degree rotation of the wing tip 110, a calibrated center position). In other words, the examples disclosed herein enable these sensors to be rigged to accurately determine at least one bias so that the wing tip 110 is properly positioned, centered, displaced and/or rotated.

Figure 3:
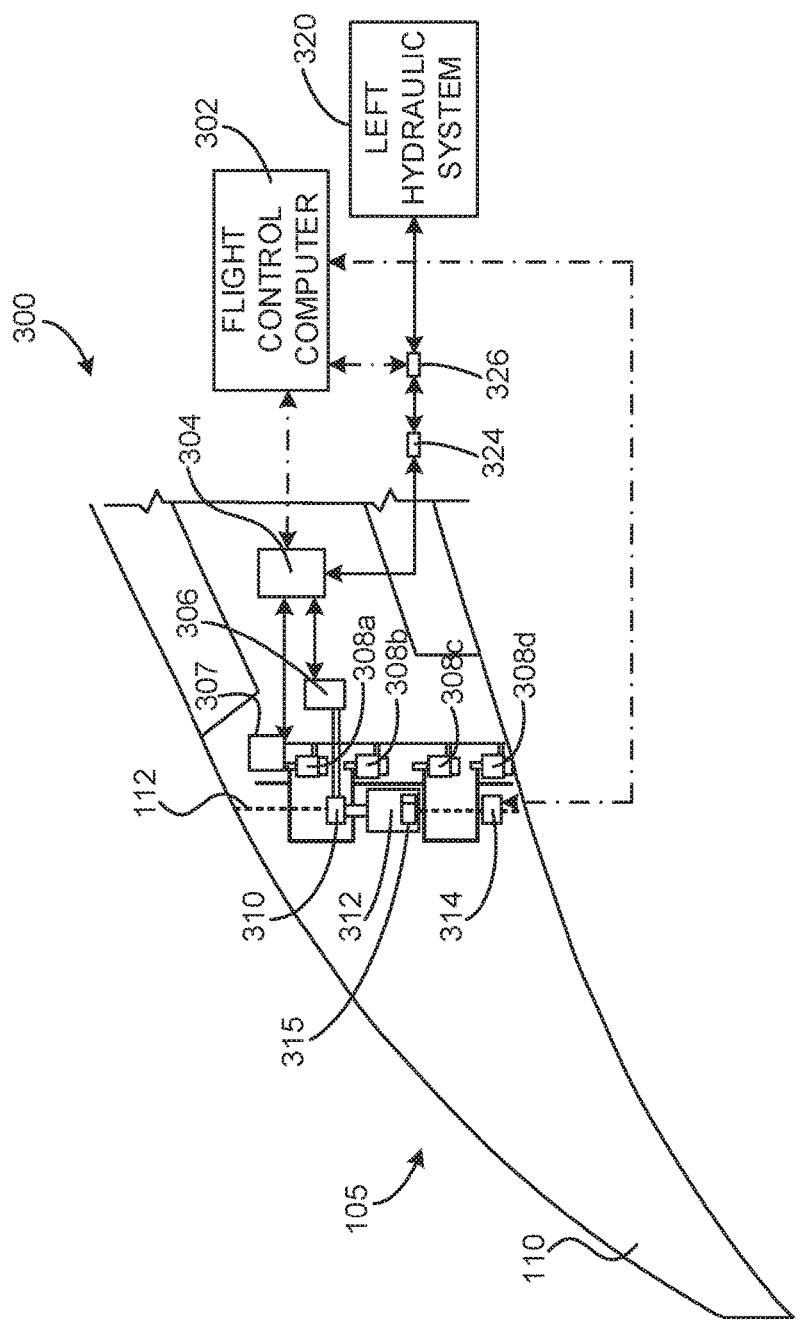
FIG. 3 illustrates an example folding hydraulic system in which the examples disclosed herein may be implemented.

FIG. 3 illustrates an example folding hydraulic system 300 in which the examples disclosed herein may be implemented. The folding hydraulic system 300 of the illustrated example includes a flight control computer 302, a hydraulic controller (e.g., a hydraulic control module) 304, a power drive unit 306, a drive line sensor (e.g., a hydraulic position sensor) 307, locks or latches 308 (hereinafter 308a, 308b, 308c, 308d, etc.), an angle gearbox 310, a rotary actuator (e.g., a rotary fold actuator, a rotary hydraulic actuator, etc.) 312, a hinge line sensor (e.g., a wing tip position sensor) 314 and a drive line bias sensor 315. The example folding hydraulic system 300 also includes a left wing hydraulic system (e.g., a single wing hydraulic system) 320, a transfer valve 324 and an isolation valve 326.

To direct and/or cause folding of the wing tip 110 about the hinge line 112, the flight control computer 302 of the illustrated example provides a movement command to the hydraulic controller 304 which, in turn, directs movement of hydraulic fluid flowing from the isolation valve 326 to the hydraulic controller 304. The hydraulic fluid is then directed by the hydraulic controller 304 to the power drive unit 306 to move and/or rotate the angle gearbox 310 and, in turn, the rotary actuator 312, thereby rotating the wing tip 110.

To hold and/or maintain a position of the wing tip 110 in a folded or deployed angular position, the latches 308 maintain the wing tip 110 in a locked position by preventing rotation of the wing tip 110 about the hinge line 112. In particular, the example hydraulic controller 304 directs hydraulic fluid to the latches 308 to lock the wing tip 110 at a desired angular position. In this example, the latches 308 maintain the wing tip 110 at the deployed position 230.

To detect a position and/or characterize motion or bias(es) of the wing tip 110 as the wing tip 110 is moved based on a defined input signal (e.g., an input waveform), the hinge line sensor 314 acquires movement data (e.g., angular position measurements) of the wing tip 110 as the wing tip is rotated and provides this movement data to the flight control computer 302. According to the illustrated example, the drive line position sensor 307 and/or the drive line bias sensor 315 measures the movement data pertaining to the drive line during the movement of the wing tip 110. In other words, and as discussed below in connection with FIGS. 4A-9, the movement and/or motion of the wing tip 110 is analyzed to determine a bias and/or adjusted positioning of the wing tip 110. In this example, pressure measurements are taken by the hydraulic controller 304 to calculate a drive line bias pertaining to the drive line bias sensor 315 in addition to a hinge line bias.

FIGS. 4A-4D are example graphs 400, 410, 420, 430, respectively, illustrating how the examples disclosed herein may characterize backlash to determine at least one bias associated with the wing tip 110 in accordance with the teachings of this disclosure. The example of FIGS. 4A-4D is directed to determining a hinge line bias and a drive line bias. However, in some examples, only a single bias is calculated instead of both of these biases.

Turning to FIG. 4A, the aforementioned graph 400 is a histogram plot that includes a horizontal axis 402 that represents a number of occurrences of reading measurements and a vertical axis 404 that represents angular rotation in degrees. According to the illustrated example of FIG. 4A, a histogram curve 408 represents recorded angular positions during a defined or controlled movement of the wing tip 110. An example input signal waveform corresponding to this defined movement is described in detail below in connection with FIG. 7. In this example, a peak (e.g., a peak of histogram data) 409 of the curve 408 corresponds to a hinge line bias of the wing tip 110. In particular, the relatively high occurrence of angular measurements at an approximate angular range of 1.3-1.4 degrees indicates a value of the hinge line bias of the wing tip 110. Accordingly this hinge line bias can be used to center the wing tip 110 at a corresponding deployed position and/or accurately control rotational movement of the wing tip 110.

Turning to FIG. 4B, the example graph 410 corresponds to the movement of the wing tip 110 shown in graph 400, but instead includes a horizontal axis 412 that corresponds to an angular command (e.g., a folding control angle, an input fold angle, a hydraulic input command angle, etc.) corresponding to the folding hydraulic system 300 and/or the hydraulic control module 304. Accordingly, a vertical axis 414 corresponds to a rotational angle of the wing tip 110 in degrees.

According to the illustrated example, a curve 416 includes a minor divergence region or left side region 415, a minor inflection point 417, a major inflection point 418, and a divergence region 419. As can be seen in the example graph 410, the major inflection point 418 defines a transition in the curve 416 in which the wing tip 110 begins to rotate, thereby defining a backlash transition and the divergence region 419 of the curve 416. In this example, the minor inflection point 417 defines a transition in the curve 416 in which the wing tip 110 begins to preload the extend stop, thereby defining a backlash transition and the corresponding left side region 415 of the curve 416. The minor inflection point 417 is referred to as a left side of backlash (LSOB). In other words, movements of the folding hydraulic system 300 do not significantly move the wing tip 110 until the inflection point 418 is reached. Accordingly, the graph 410 illustrates the effectiveness of determining the hinge line bias using histogram data, as shown in graph 400. In some examples, the inflection point 418 and/or the minor inflection point 417 is utilized to determine the hinge line bias.

Turning to FIG. 4C, the example graph 420 is a histogram plot of pressure differential readings measured at a hydraulic system such as the folding hydraulic system 300 of FIG. 3. In particular, the pressure difference readings are measured in relationship to movement of the rotary actuator 312 of FIG. 3 caused by the input signal waveform. In this example, the graph 420 includes a horizontal axis 422, which represents a number of measured points, and a vertical axis 424, which represents a change in pressure (e.g., a delta or ΔP) in pounds per square in (psi). As can be seen in FIG. 4C, a curve 426 includes a peak 428, and represents a pressure difference of the folding hydraulic system 300 of FIG. 3 to move the wing tip 110 based on the input signal wave form of FIG. 7 that defines movement of the rotary actuator 312 via the hydraulic controller 304.

FIG. 4D relates pressure differences corresponding to the motion of the wing tip 110 to command input angles. In particular, the graph 430 demonstrates calculation or determination of a drive line bias based on the peak 428 determined in the graph 420 of FIG. 4C. The example graph 430 of FIG. 4D includes a horizontal axis 432 that corresponds to an angular command (e.g., a folding control angle, an input fold angle, etc.) in degrees and a vertical axis 434 that corresponds to the pressure difference.

In this example, a curve 435 represents the pressure difference changes over the angular command range using the defined movement. The example curve 435 includes an increasing portion 436, and a transition point 438 that defines a relatively flat portion 440. In this example, the pressure difference value corresponding to the transition point 438 corresponds to the drive line bias. In this example, the drive line bias is approximately equal to 31.4 degrees and corresponds to a pressure differential of approximately between −210 to −220 psi.

In this example, an intersection of the curve 435 with the determined pressure difference from the histogram graph 420 is used to determine the drive line bias. In some examples, this intersection point is used in calculating a difference of pressure differences between the pressure difference at the intersection point and a pressure difference at the lowest portion of the increasing portion 436. In this example this difference of pressure differences is approximately −529 psi (e.g., a difference of a point of the lowest portion of approximately 739 psi and the intersection point of approximately −210 psi). In such examples, this difference of pressure differences is used as a convergence criteria (e.g., a convergence criteria of approximately −500 psi) to determine whether to continue iterating to determine the biases corresponding to the wing tip 110. If the convergence criteria is not met, the wing tip 110 is moved by an angular increment before the input signal waveform is applied again.

To determine the drive line bias and/or characterize a range of motion of the folding hydraulic system 300, in some examples, a first curve is fitted to the increasing portion 436 to the left of the transition point 438, and a second curve is fitted to the relatively flat portion 440 to the right of the transition point 438. In some examples, a portion of the curve 435 is removed or truncated to determine or characterize movement of the drive line bias (e.g., the relatively flat portion 440 is removed).

Figure 5:
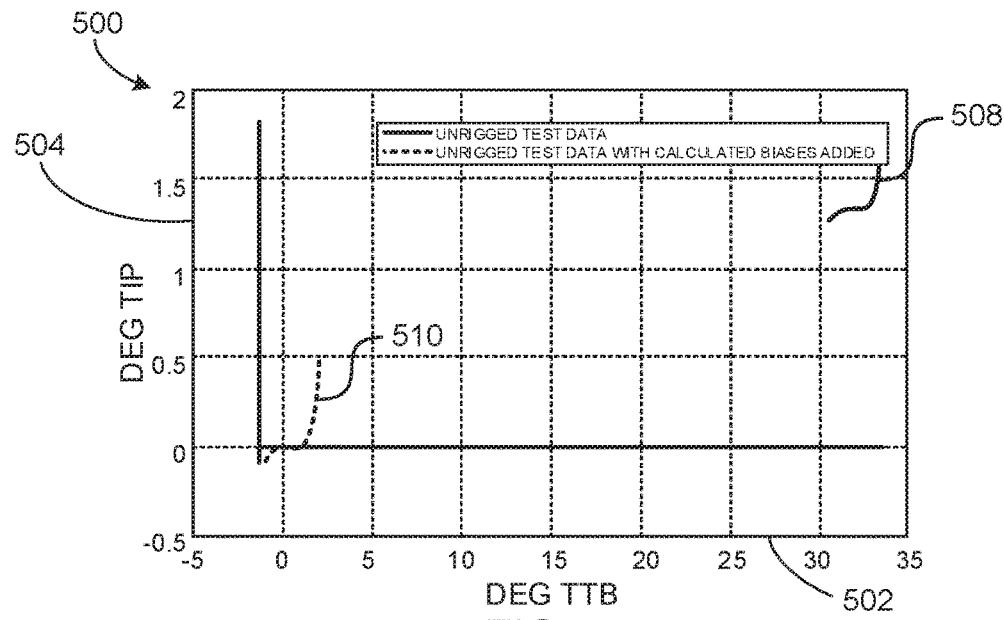
FIG. 5 is a graph depicting example bias adjustment results of the examples disclosed herein.

FIG. 5 is a graph 500 depicting example bias adjustment results of the examples disclosed herein. In particular, the example graph 500 illustrates adjusted motion that takes into account both drive line and hinge line biases. The graph 500 includes a horizontal axis 502 that represents an input command angle, and a vertical axis 504 that represents angular displacement of the wing tip 110 in degrees. In this example, a first curve 508 represents actual movement data including the biases. Accordingly, a second curve 510 represents rigged (e.g., calibrated) angular motion of the wing tip 110 that is adjusted for both of these biases. The displacement of the first and second curves 508, 510 represents an adjusted movement profile of the wing tip 110 based on the calculated biases.

Figure 6:
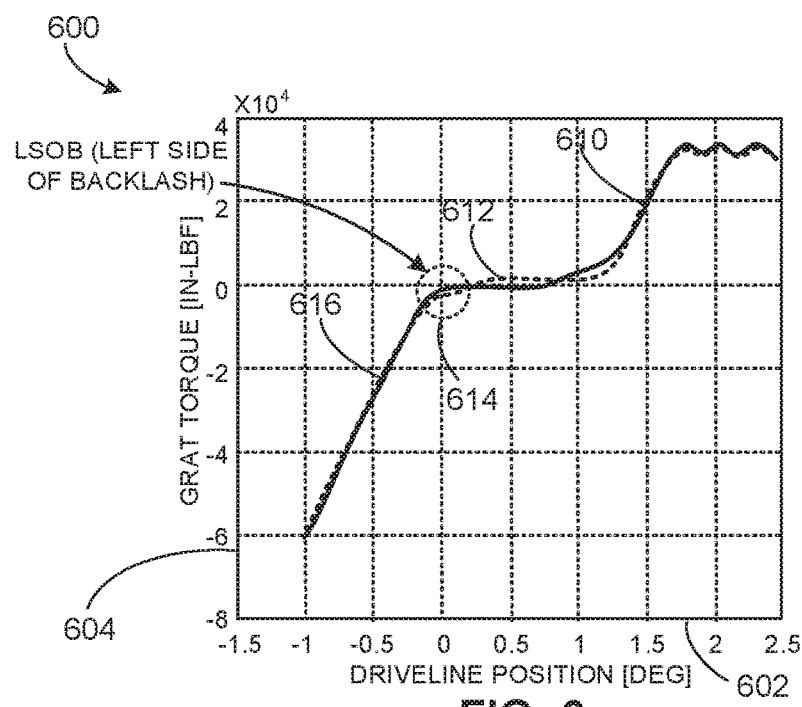
FIG. 6 is a graph depicting example adjusted resultant torque characteristics corresponding to the examples disclosed herein.
Figure 7:
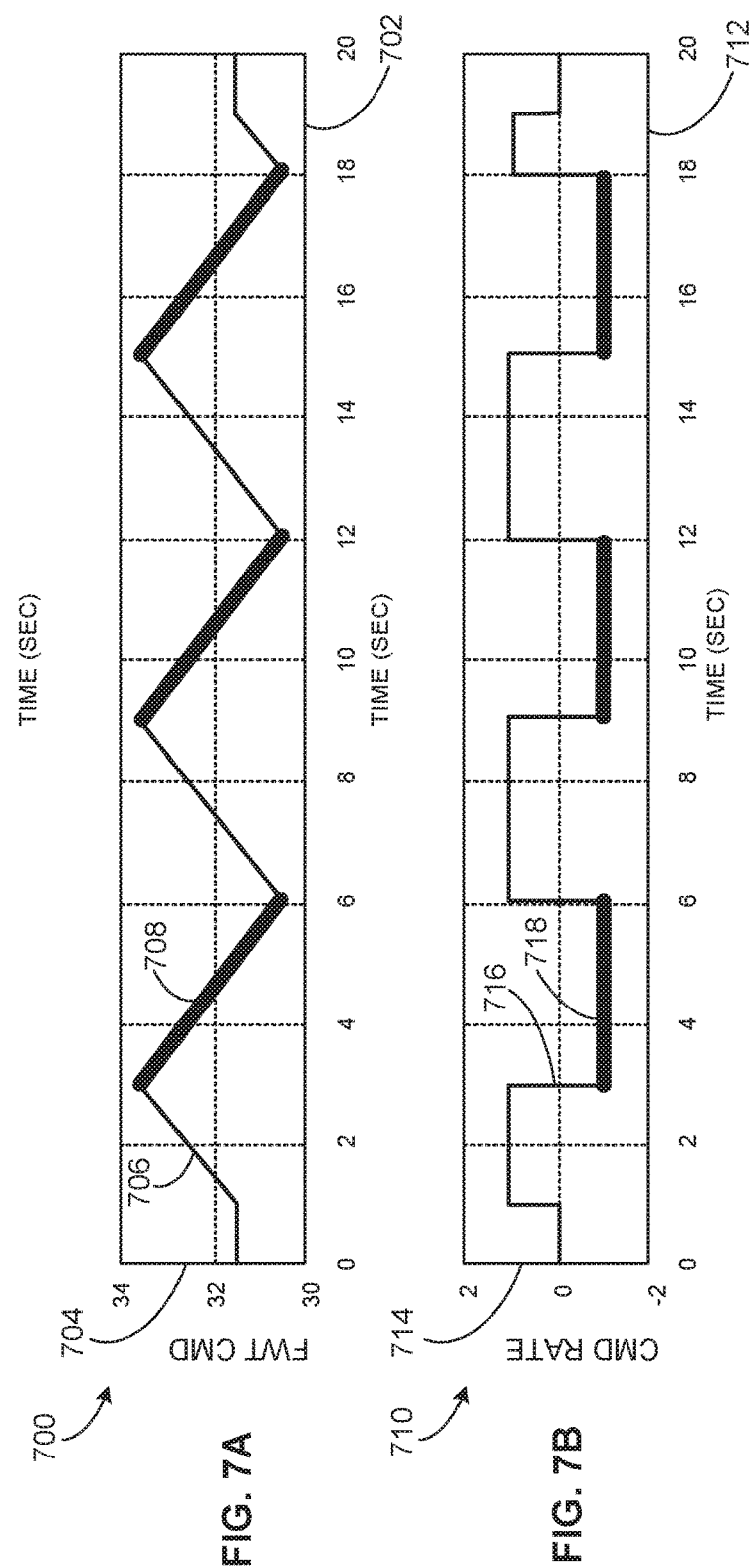
FIGS. 7A and 7B depict example actuation signal waveforms that may be implemented in the examples disclosed herein.

FIG. 6 is a graph 600 depicting example adjusted resultant torque characteristics corresponding to the examples disclosed herein. The graph 600 includes a horizontal axis 602 representing an angular rotation of the folding hydraulic system 300, and a vertical axis 604 that represents a torque output of the rotary actuator 312. Further curves 610, 612 represent different torque hysteresis of the rotary actuator 312 over the angular range of the folding hydraulic system 300 during different motions of the wing tip 110. As can be seen in the illustrated example of FIG. 6, torque varies between the two curves 610, 612 past a transition point 614, which generally defines a left side of backlash (LSOB) region 616 in this example. In particular, the LSOB region 616 defines an angular range in which motion of the wing tip 110 occurs without significant backlash for either folding or deploying motions.

FIGS. 7A and 7B depict different plots corresponding to an example actuation signal waveform (e.g., an input signal, a motion input, etc.) that may be implemented in the examples disclosed herein. In particular, FIGS. 7A and 7B depict a single iteration to determine a hinge line bias and or a drive line bias. In this example, the actuation signal waveform includes a repeating pattern of triangular or sawtooth waves that are provided to the hydraulic controller 304 and/or the rotary actuator 312 to direct rotational movement of the wing tip 110 so that bias and/or backlash information can be obtained.

Turning to FIG. 7A, a first plot 700 corresponding to the example actuation signal waveform includes a horizontal axis 702 that also represents time and a vertical axis 704 that represents a command or input angle waveform of the folding hydraulic system 300. In particular, the triangular command waveform includes rising portions 706 and respective decreasing portions 708 to define a generally sawtooth-shaped pattern to be provided by the hydraulic controller 304 to the rotary actuator 312.

A second plot 710 corresponding to the example waveform also includes a horizontal axis 712 that represents time as and a vertical axis 714 representing an angular rate (e.g., a differential of the first plot 700). Accordingly, the second plot 710 includes a generally square angular rate having rising/decrease portions 716 as well as relatively flat portions 718. In some examples, only negative rate sections of the plots 700 and 710 are used to characterize the movement of the wing tip 110. In such examples, movement data is only collected during the decreasing portions 708 and the relatively flat portions 718.

Figure 8:
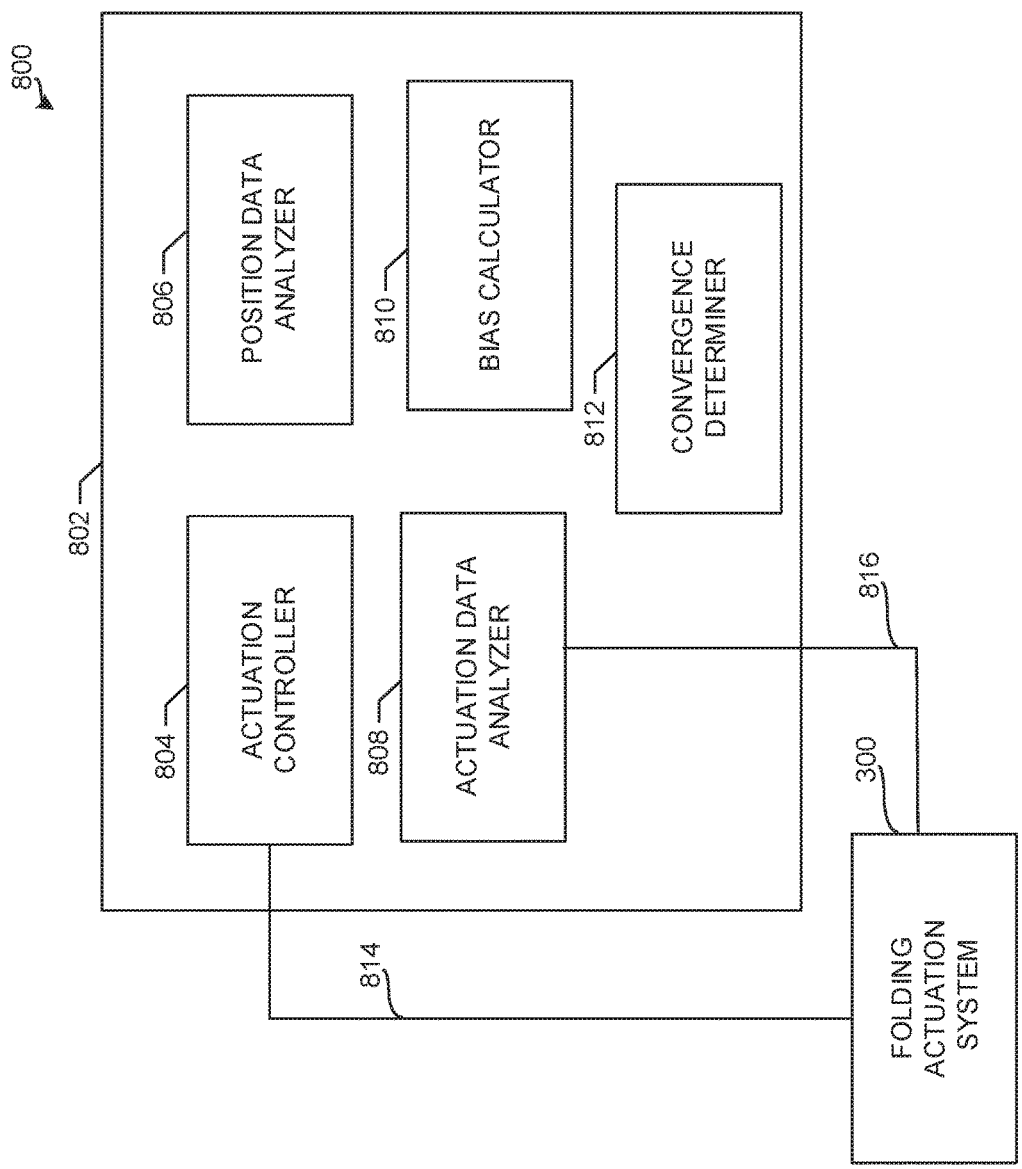
FIG. 8 is a schematic overview of a bias computation system that may be implemented in the examples disclosed herein.

FIG. 8 is a schematic overview of a bias computation system 800 that may be implemented in the examples disclosed herein. In particular, the bias computation system 800 may be implemented in the flight control computer 302. The bias computation system 800 of the illustrated example includes a computation portion 802, which includes an actuation controller 804, a position data analyzer 806, an actuation data analyzer 808, a bias calculator 810 and a convergence determiner 812. In this example, the actuation controller 804 is communicatively coupled to the folding hydraulic system 300 via a communication line 814, and the actuation data analyzer 808 is communicatively coupled to the folding actuation system 300 via a communication line 816.

To control a movement of the folding hydraulic system 300 and/or the rotary actuator 312 so that a backlash and/or bias corresponding to the wing tip 110 can be characterized, the actuation controller 804 of the illustrated example provides a waveform control signal (e.g., a sawtooth and/or triangular waveform signal, etc.) to the folding hydraulic system 300 and/or the rotary actuator 312, thereby causing a rotational movement of the rotary actuator 312 and the corresponding wing tip 110.

To characterize a bias and/or backlash associated with folding of the wing tip 110, the example position data analyzer 806 analyzes position and/or movement data and/or pressure data from the actuation data analyzer 808 during the controlled movement. In turn, the example bias calculator 810 calculates any appropriate bias(es) and/or offsets (e.g., calibration offsets) based on the analyzed position and/or movement data and/or pressure data to adjust for the backlash associated with the wing tip 110. For example, the bias calculator 810 may utilize histogram data (e.g., pressure and/or position) and/or characteristic movement curves (e.g., by utilizing data and analysis represented in the graphical forms demonstrated in the graphs of FIGS.

4A-4D). For example, the bias calculator 810 may utilize line fits (e.g., linear regression line fits).

According to the illustrated example of FIG. 8, the convergence determiner 812 determines whether a convergence criteria has been met and, thus, whether the actuation controller 804 is to further change or increment an angular displacement of the wing tip 110 so that the waveform control signal can be repeatedly applied to determine at least one bias. In particular, as described above in connection with FIG. 4D, a value of change in pressure difference (e.g., a change in pressure differential) associated with the folding hydraulic system 300 being above a threshold pressure change (e.g., a threshold value pertaining to a pressure change) is used to determine this convergence. Additionally or alternatively, the convergence criteria is related to a percentage of change of a calculated bias between iterations (e.g., the calculated hinge line bias or the drive line bias only changes by less than 1% between iterations).

While an example manner of implementing the bias computation system 800 of FIG. 8 is illustrated in FIG. 8, one or more of the elements, processes and/or devices illustrated in FIG. 8 may be combined, divided, re-arranged, omitted, eliminated and/or implemented in any other way. Further, the example actuation controller 804, the example position data analyzer 806, the example actuation data analyzer 808, the example bias calculator 810, the example convergence determiner 812 and/or, more generally, the example bias computation system 800 of FIG. 8 may be implemented by hardware, software, firmware and/or any combination of hardware, software and/or firmware. Thus, for example, any of the example actuation controller 804, the example position data analyzer 806, the example actuation data analyzer 808, the example bias calculator 810, the example convergence determiner 812 and/or, more generally, the example bias computation system 800 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, actuation controller 804, the example position data analyzer 806, the example actuation data analyzer 808, the example bias calculator 810, and/or the example convergence determiner 812 is/are hereby expressly defined to include a non-transitory computer readable storage device or storage disk such as a memory, a digital versatile disk (DVD), a compact disk (CD), a Blu-ray disk, etc. including the software and/or firmware. Further still, the example bias computation system 800 of FIG. 8 may include one or more elements, processes and/or devices in addition to, or instead of, those illustrated in FIG. 8, and/or may include more than one of any or all of the illustrated elements, processes and devices.

Figure 9:
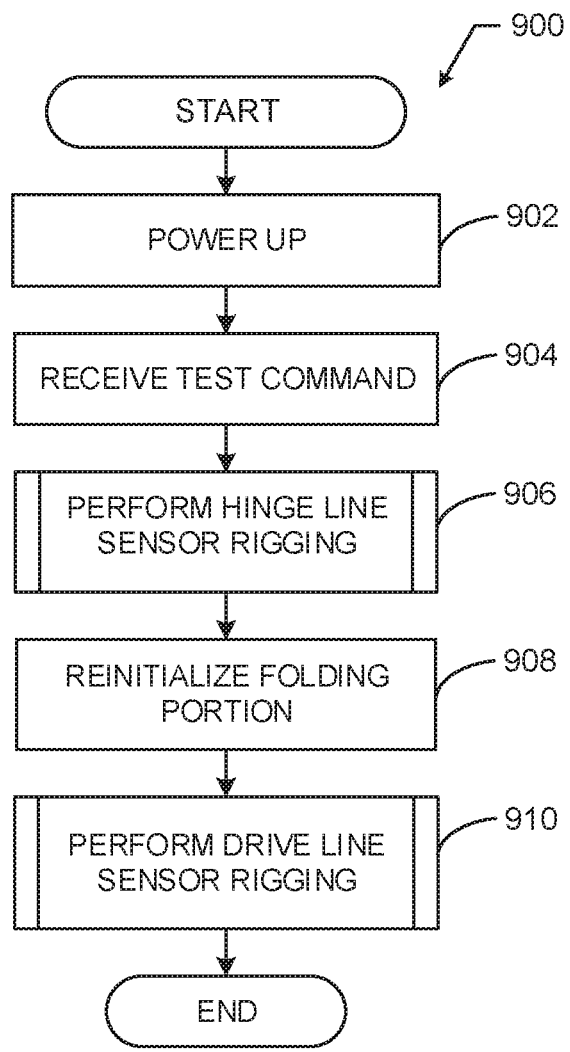
FIG. 9 is a flowchart illustrating an example method that may be implemented with the examples disclosed herein.
Figure 10:
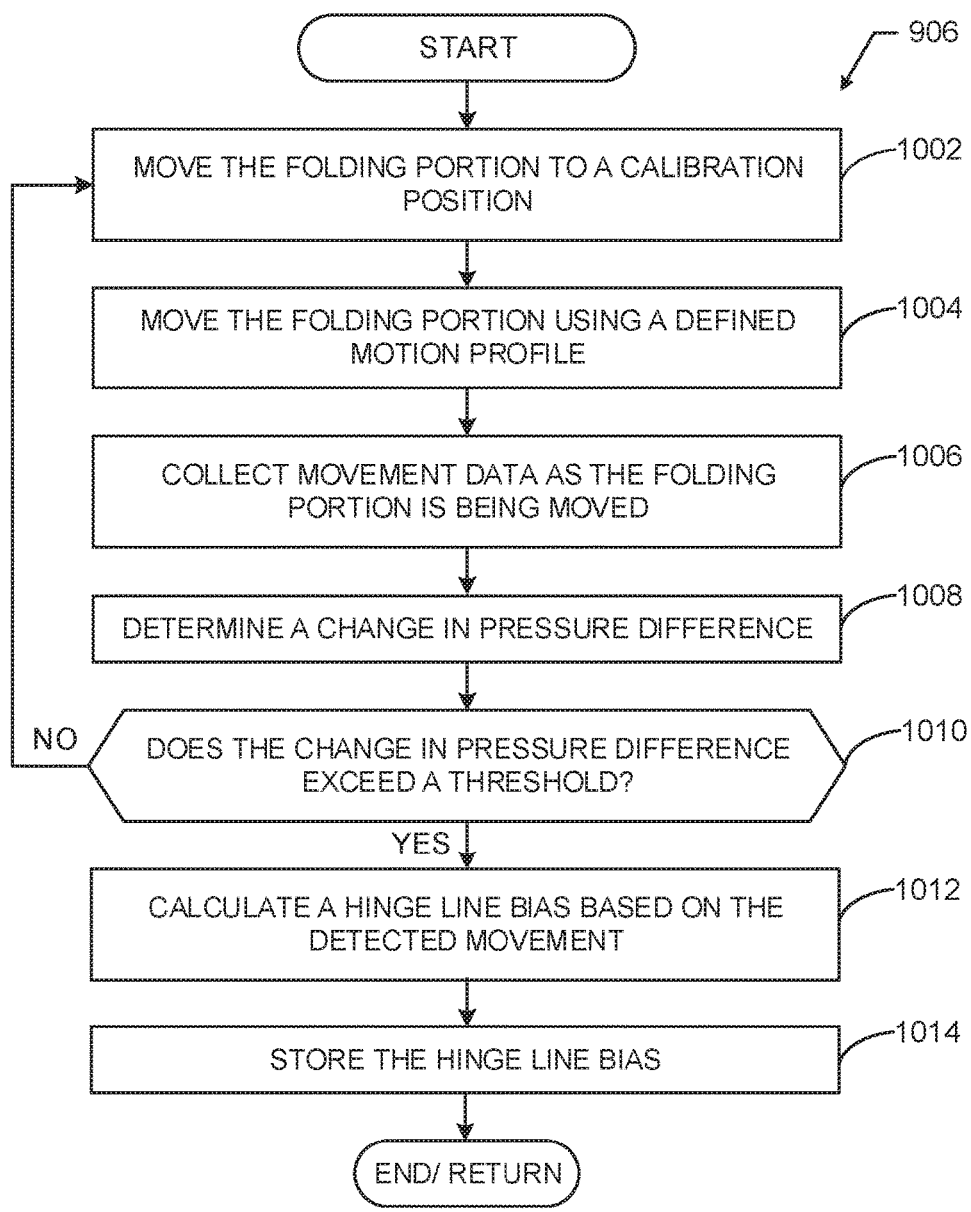
FIG. 10 is a flowchart illustrating an example method to calculate a hinge line bias.
Figure 11:
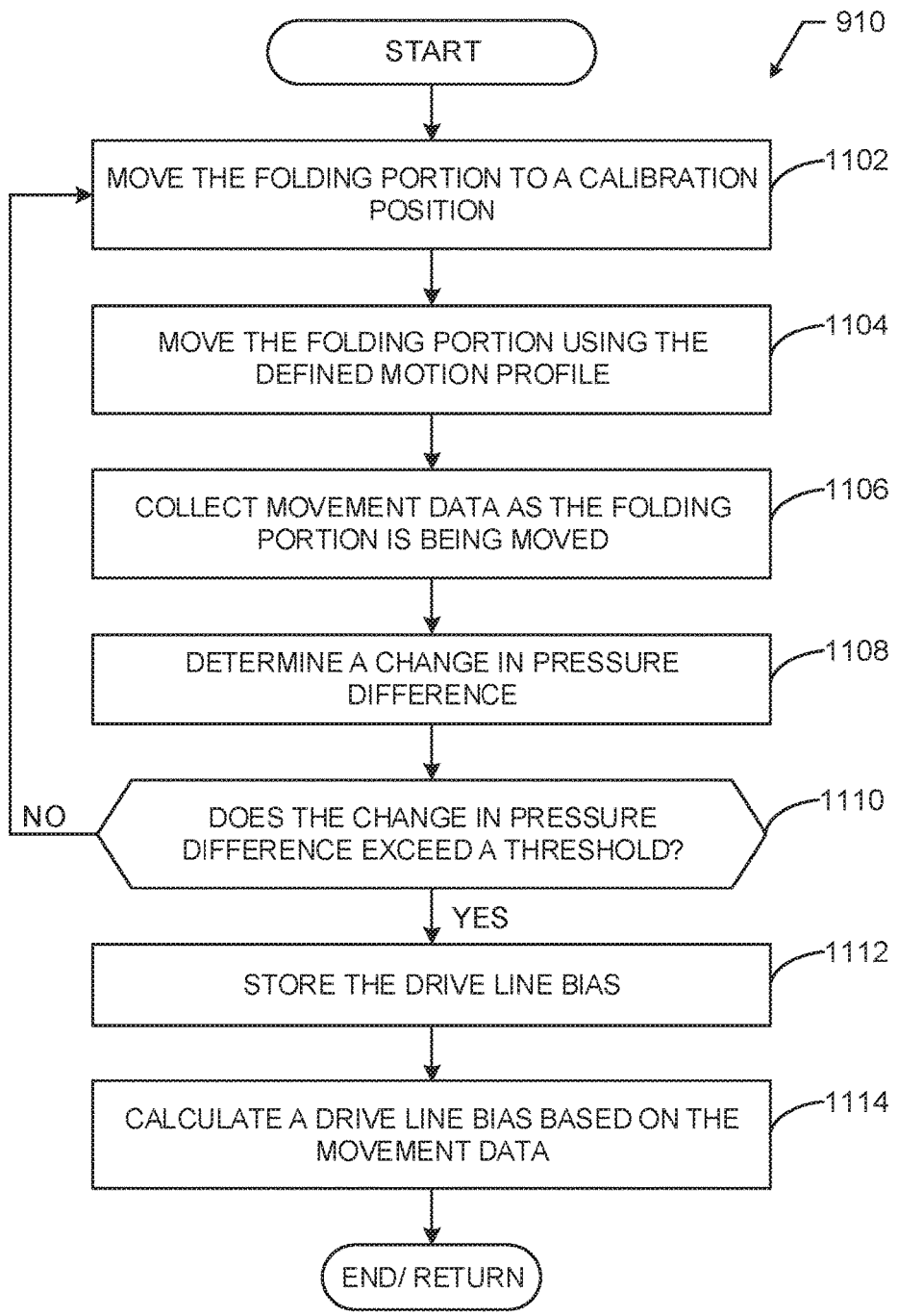
FIG. 11 is a flowchart illustrating an example method to calculate a drive line bias.

Flowcharts representative of example methods for implementing the bias computation system 800 of FIG. 8 are shown in FIGS. 9-11. In this example, the methods may be implemented using machine readable instructions that comprise a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 9-11, many other methods of implementing the example bias computation system 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example methods of FIGS. 9-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example method 900 of FIG. 9 begins as a folding portion (e.g., the wing tip 110) is to be centered and/or rotationally calibrated. In particular, any biases associated with backlash of the folding hydraulic system 300 and/or mechanical implementation of the folding portion (e.g., tolerances, mechanical backlash and/or assembly variation) are to be characterized to maintain the folding portion in an accurate rotational control by compensating for these biases.

In this example, the folding actuation system 300 is powered on (block 902). In particular, switching the power on initializes an automated check of rotational movement of the folding portion by the hydraulic controller 304.

The example flight control computer 302 and/or the example hydraulic controller 304 receives a test command (block 904). In this example, the test command directs the hydraulic controller 304 to provide a waveform signal (e.g., a triangular or sawtooth signal waveform) to the rotating actuator 312.

According to the illustrated example, hinge line sensor rigging is performed (block 906). The hinge line sensor rigging includes calculating a hinge line bias and is described in greater detail below in connection with FIG. 10.

In this example, the folding portion is reinitialized (block 908). For example, the folding portion may be rotated by the rotating actuator 312 to a current centered rotation angle (e.g., approximately 0 degrees) based on the calculated hinge line bias. Additionally or alternatively, the folding portion is rotated to an initial locked or deployed position.

Next, drive line sensor rigging is performed (block 910), and the process ends. In particular, a drive line bias corresponding to the folding portion is calculated. The drive line sensor rigging is described in greater detail below in connection with FIG. 11.

While the example method 900 is directed to rigging both the hinge line sensor and the drive line sensor, the examples disclosed herein may be directed to one of the hinge line bias or the drive line bias. In some examples, the method 900 is performed between flights, during maintenance and/or during a calibration process. Additionally or alternatively, the example method 900 is performed based on any assembly or repair of the folding portion.

Turning to FIG. 10, the subroutine 906, which is directed to an example method of iteratively rigging and/or calibrating the hinge line sensor 314 is shown. In particular, the hinge line sensor 314 pertaining to movement of the folding portion (e.g., the wing tip 110) is adjusted, centered and/or calibrated to account for a backlash associated with the folding portion.

The folding portion is moved to a calibration position (e.g., a defined rotational angle) (block 1002). According to the illustrated example, the folding portion is initially (e.g., at the first iteration) rotated to an angular rotation proximate or at a deployed angle.

According to the illustrated example, the folding portion is then moved and/or rotated using a defined movement profile and/or waveform input signal (e.g., the input waveform signal shown in FIG. 7) (block 1004). In this example, the rotating actuator 312 is provided with a triangular and/or sawtooth input signal until the folding portion is rotated to a fully extended and locked position.

In this example, the position data analyzer 806 collects data from the hinge line sensor 314 associated with hinge line movement of the folding portion during the defined motion profile (block 1006). In this example, angular movement data (e.g., position and/or rate of rotation data with respect to time, etc.) is collected by the hinge line sensor 314.

Next, a change in pressure difference is determined and/or calculated (block 1008). In this example, the change in pressure difference is determined by the hydraulic controller 304, as described above in connection with FIG. 4D.

It is then determined if the change in pressure difference exceeds a threshold criteria (block 1010). If the change in pressure difference does not exceed the threshold (block 1010), control of the process returns to block 1002. Otherwise, the control of the process proceeds to block 1012

In this example, the hinge line bias is then calculated by the bias calculator 810 based on the detected movement during the defined motion profile if the change in pressure difference criteria is met (block 1012). In particular, the bias calculator 810 calculates the hinge line bias by utilizing histogram data of the hinge line position. In some examples, the top 65-75% (e.g., 70%) of values of the histogram data is used to calculate the hinge line bias. In some examples, a negative mean of the histogram points is calculated to be the hinge line bias. Additionally or alternatively, a peak of the histogram data is used to determine the hinge line bias. In some examples, peaks of the histogram data are averaged to determine the hinge line bias.

In this example, the hinge line bias is then stored (block 1014) and the process returns/ends.

FIG. 11 illustrates the example subroutine 910, which is directed to an example method of rigging the drive line position sensor 307 and/or the drive line bias sensor 315. In particular, the drive line bias sensor 315 is to be adjusted (e.g., centered) based on a calculated drive line bias.

The folding portion is moved to a calibration position (block 1102). In particular, the actuation controller 804 moves the folding portion to an angle. Initially (e.g., during the first iteration), the folding portion is moved to the determined center angle of the folding portion (e.g., zero degrees accounting for the hinge line bias of the hinge line components). Otherwise, the folding portion is moved by a defined increment between iterations.

According to the illustrated example, the folding portion is moved by the actuation controller 804 and the rotating actuator 312 based on the defined motion profile and/or waveform input signal (block 1104). In this example, the rotating actuator 312 is also provided with the same triangular and/or sawtooth input signal used during determination of the hinge line bias during the subroutine 906.

Next, the actuation data analyzer 808 and/or the position data analyzer 806 collects data from the drive line position sensor 307 and/or the drive line bias sensor 315 during the defined movement of the folding portion (block 1106). In this example, the drive line bias sensor 315 is implemented as a position sensor to provide the data.

Next, a change in pressure difference is determined and/or measured (block 1108). In this example, this change in pressure difference is determined and/or measured by the hydraulic controller 304. In this example, the change in pressure difference is calculated by subtracting the identified change in pressure difference from a minimum change in pressure difference of the aforementioned curve fit.

It is then determined if the change in pressure difference exceeds a threshold criteria (block 1110). If the change in pressure difference does not exceed the threshold (block 1110), control of the process returns to block 1102. Otherwise, control of the process proceeds to block 1112

According to the illustrated example, the bias calculator 810 calculates the drive line sensor bias of the drive line bias sensor 315, for example, based on the detected movement and pressure data during the defined motion profile (block 1112). In this example, a histogram of the pressure differences is generated and a change in pressure differences is calculated using the top 5-15% (e.g., 10%) occurrence values of this histogram so that a positive mean value is used to calculate the change in pressure differences. In some examples, the folding portion is rotated to the peak change in pressure difference to identify a corresponding command input angle associated with the drive line bias. In this example, a left side of bias is characterized. Additionally or alternatively data to the right of the left side of bias is eliminated. In some examples, as described above in connection with FIG. 4D, at least one curve fit is used to find an intersection of this curve fit and the identified peak change in pressure difference to determine the left side of backlash.

In this example, the drive line bias is then stored (block 1114) and the process returns/ends.

Figure 12:
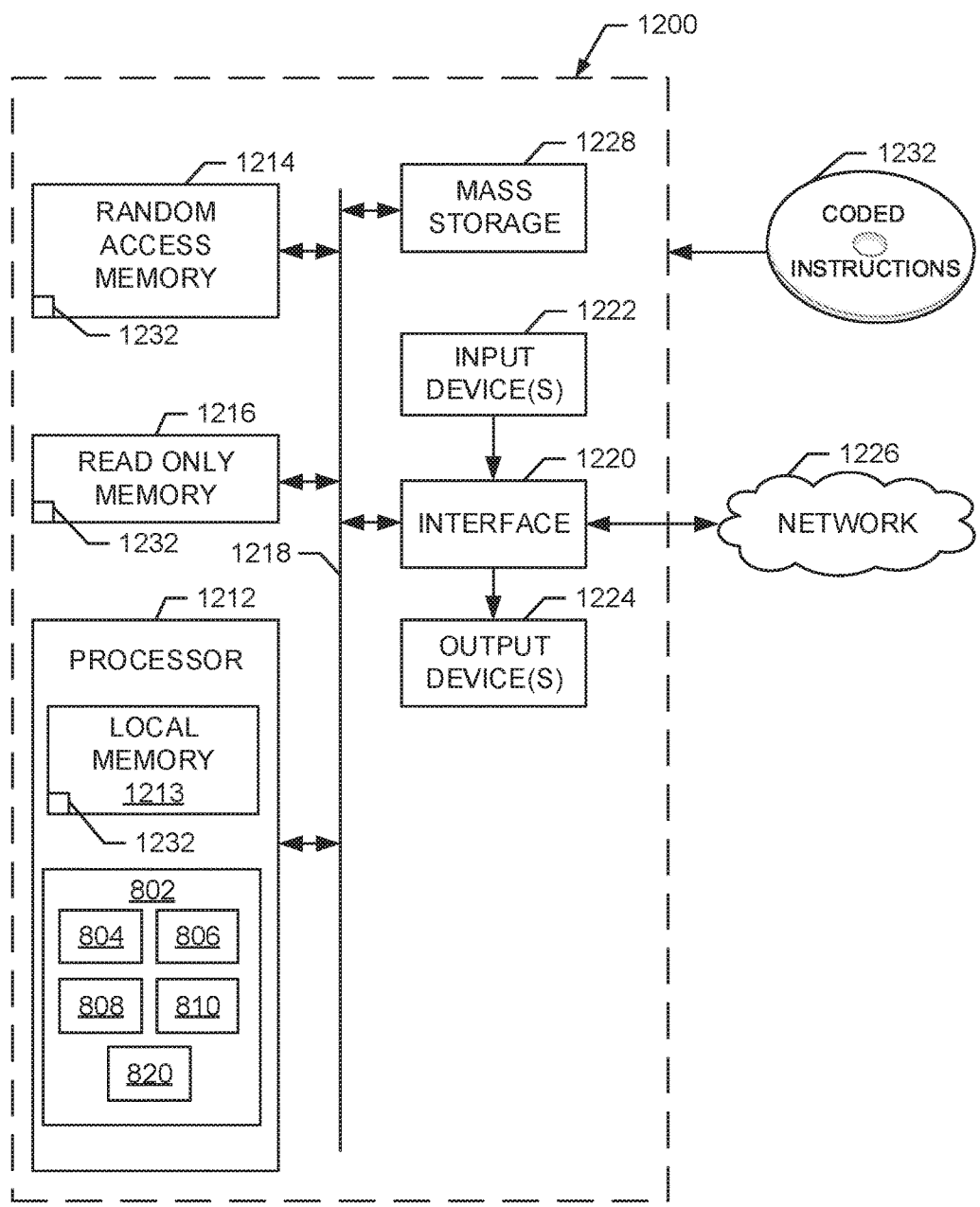
FIG. 12 is a block diagram of an example processor platform capable of executing machine readable instructions to implement the example methods of FIGS. 9, 10 and/or 11, and the bias computation system of FIG. 8.

FIG. 12 is a block diagram of an example processor platform 1200 capable of executing instructions to implement the example methods of FIGS. 9-11 and the bias computation system 800 of FIG. 8. The processor platform 1200 can be, for example, a server, a personal computer, a mobile device (e.g., a cell phone, a smart phone, a tablet such as an iPad™), a personal digital assistant (PDA), a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor 1212 implements the example actuation controller 804, the example position data analyzer 806, the example actuation data analyzer 808, the example bias calculator 810 and the example convergence determiner 812.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 9-11 may be stored in the mass storage device 1228, in the volatile memory 1214, in the non-volatile memory 1216, and/or on a removable tangible computer readable storage medium such as a CD or DVD.

From the foregoing, it will be appreciated that example methods, apparatus and articles of manufacture have been disclosed that provide an effective and accurate method of adjusting one or more biases, which may be related to a hinge line or a drive line of an actuated folding system. The examples disclosed herein enable more frequent automated adjustments of aircraft wing tips, thereby enabling accurate positioning of the wing tips to ensure a reduced drag coefficient without significant labor and associated labor costs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are directed to folding aircraft wing tips, the examples disclosed herein may be applied to any appropriate folding and/or actuated folding application.

What is claimed is:

1. An apparatus comprising:
   an actuator to cause a movement of a folding portion of an aerodynamic structure, the folding portion having an associated backlash;
   a sensor to acquire movement data of the folding portion during movement of the folding portion;
   a position data analyzer to generate histogram data based on the movement data; and
   a processor to determine a bias of the folding portion based on the movement data to characterize the backlash.

2. The apparatus as set forth in claim 1, wherein the position data analyzer identifies a peak of the histogram data to determine the bias.

3. The apparatus as set forth in claim 1, wherein the bias includes a hinge line bias or a drive line bias.

4. The apparatus as set forth in claim 1, wherein the sensor is a pressure sensor of a hydraulic system that is operatively coupled to the folding portion.

5. The apparatus as set forth in claim 4, wherein the actuator is to repeat the movement of the folding portion until a change in pressure differential measured at the pressure sensor exceeds a threshold value.

6. The apparatus as set forth in claim 1, wherein the movement is responsive to a triangular waveform.

7. The apparatus as set forth in claim 1, wherein the folding portion includes an aircraft wing tip.

8. A method comprising:
   moving, via an actuator, a folding portion of an aerodynamic structure, the folding portion having an associated backlash;
   acquiring movement data during the moving of the folding portion;
   generating histogram data based on the movement data; and
   calculating, via a processor, a bias of the folding portion based on the movement data to characterize the backlash.

9. The method as set forth in claim 8, further including adjusting a calibrated center position of the folding portion based on the calculated bias.

10. The method as set forth in claim 8, wherein the movement data includes position measurements.

11. The method as set forth in claim 8, wherein the movement data includes a change in pressure differential measured at a pressure sensor associated with the actuator.

12. The method as set forth in claim 8, wherein the moving of the folding portion is responsive to a triangular waveform.

13. The method as set forth in claim 8, wherein a peak of the histogram data is identified to calculate the bias.

14. The method as set forth in claim 13, wherein the movement data includes pressure data.

15. A non-transitory computer readable storage medium comprising instructions, which when executed, cause a processor to at least:
   generate histogram data based on movement data of a folding portion of an aerodynamic structure; and
   determine a bias of the folding portion based on the movement data of the folding portion to characterize a backlash associated with the folding portion.

16. A non-transitory computer readable storage medium comprising instructions, which when executed, cause a processor to at least:
   determine a bias of a folding portion of an aerodynamic structure based on movement data of the folding portion to characterize a backlash associated with the folding portion; and
   determine a calibration position of the folding portion based on the bias.

17. The non-transitory computer readable storage medium as defined in claim 15, wherein the bias is determined based on identifying a peak of the histogram data.

18. The non-transitory computer readable storage medium as defined in claim 15, wherein the movement data includes data associated with a change in pressure of a hydraulic actuator that is operatively coupled to the folding portion.

19. The non-transitory computer readable storage medium as defined in claim 15, wherein the movement data of the folding portion is responsive to a triangular waveform.

\* \* \* \* \*